Figure 1:
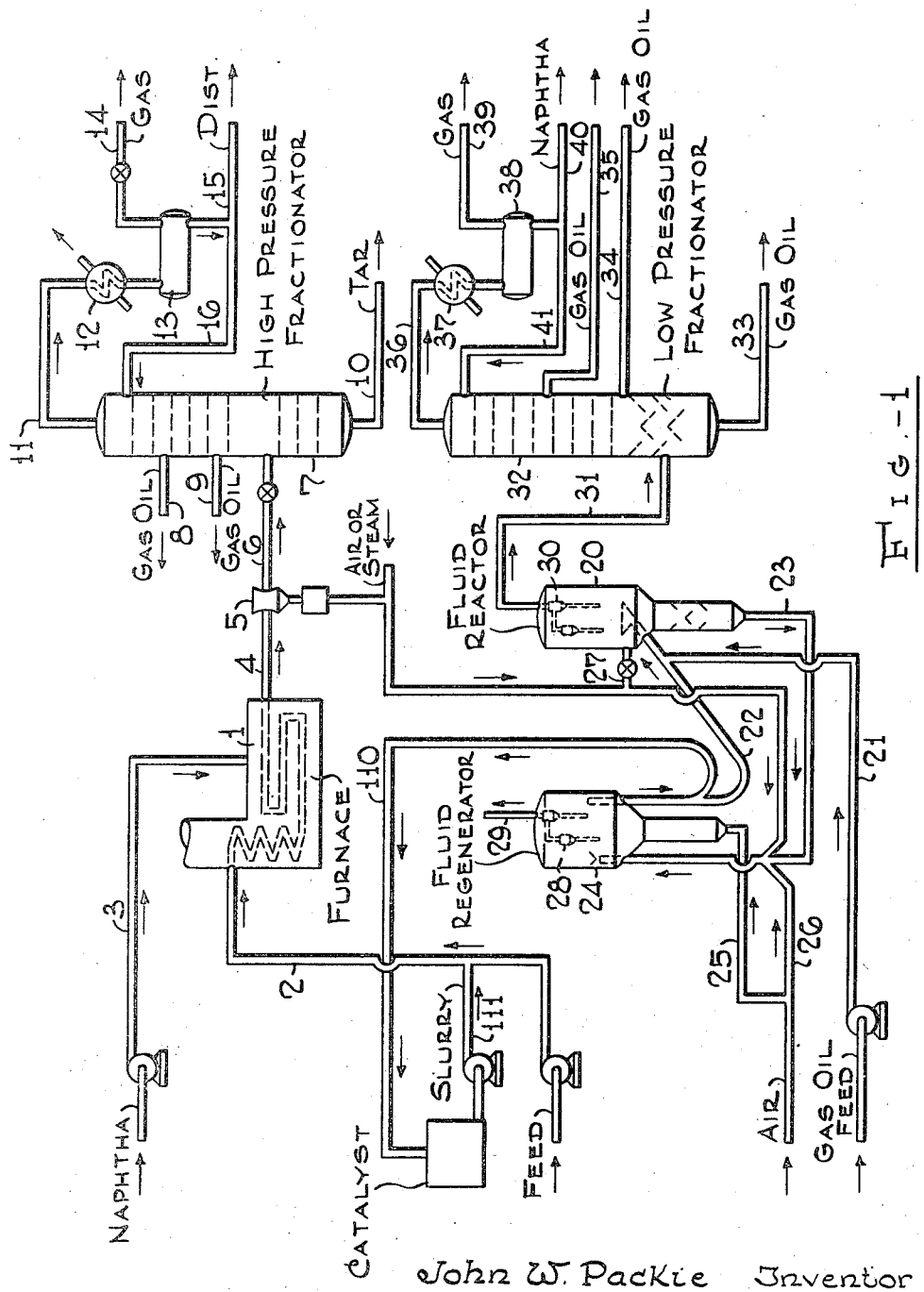

Patented Oct. 5, 1954

2,690,991

UNITED STATES PATENT OFFICE 2,690,991

CATALYTIC CRACKING OF HYDROCARBONS IN TWO STAGES

John W. Packie, Maplewood, N. J., assignor to Standard Oil Development Company, a corporation of Delaware Application October 18, 1950, Serial No. 190,751

4 Claims. (Cl. 196—49)

The present invention is concerned with an improved process for the refining of petroleum oils. The invention is more specifically concerned with a novel combination of distillation, suspensoid cracking and fluidized solids catalytic cracking processes. In accordance with the present invention, unexpected and desirable results are secured by the handling of the hydrocarbon streams in a manner adapted to secure the desired results utilizing these processing operations.

It is well known in the art to refine petroleum oils by subjecting relatively high boiling fractions of hydrocarbon oils to elevated temperatures and pressures in a manner to produce lower boiling hydrocarbon constituents. These refining or cracking operations are carried out either in the presence or in the absence of various catalytic materials. For example, it is well known in the art to conduct a fluidized solids catalytic cracking operation by subjecting hydrocarbons boiling in the gas oil boiling range and reduced crude boiling range to contact with solid catalytic particles, which particles are maintained in a state of fluidity by the velocity of upflowing gases. It is also known in the art to employ a suspensoid operation and to convert relatively high boiling hydrocarbon constituents to lower boiling constituents by subjecting hydrocarbon feed streams to relatively high temperatures and pressures under conditions wherein catalyst particles are suspended in the liquid feed streams. It has now been found that very desirable results are secured providing these processes are used in combination with one another and in combination with various distillation steps.

For instance if gas oil and reduced crude are processed in a fluid catalyst reactor as a mixture, the high amount of salt and ash in the reduced crude quickly contaminates the fluidized catalyst adversely affecting its activity and resulting in poor product yield. Also if highly refractive, or very heavy gas oil boiling in the range of 1000 to 1400° F., is processed in the fluid catalyst reactor, the yield of coke, which must subsequently be burned off the catalyst is undesirably high.

In the present invention these materials are processed in a suspensoid type operation in which they are passed through a fired coil in the presence of a relatively small amount of catalyst (2 to 10 lbs./bbl.) and subjected to high temperatures (900–1200° F.) and high pressure (200–1000 p. s. i. g.) and the catalyst then separated and returned to the fluid catalyst system. The relatively small amount of contaminated catalyst or high carbon catalyst has a greatly reduced effect on the catalyst quality in the fluid catalyst system. This processing of the reduced crude, or cyclic, or heavy gas oil through a fired coil may be carried out alone or combined with the injection of naphtha for reforming in the same coil.

Figure 2:
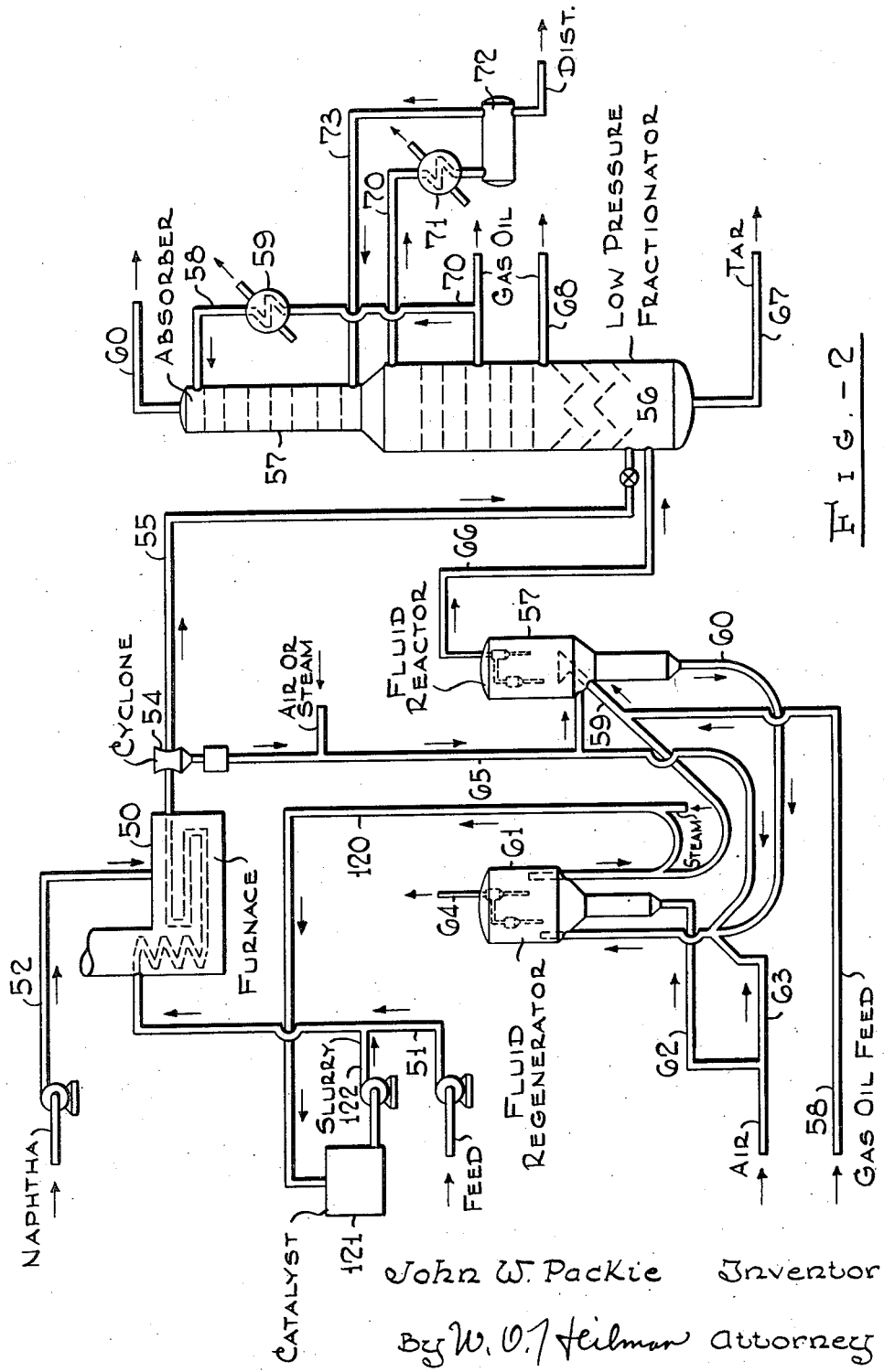
Figure 3:
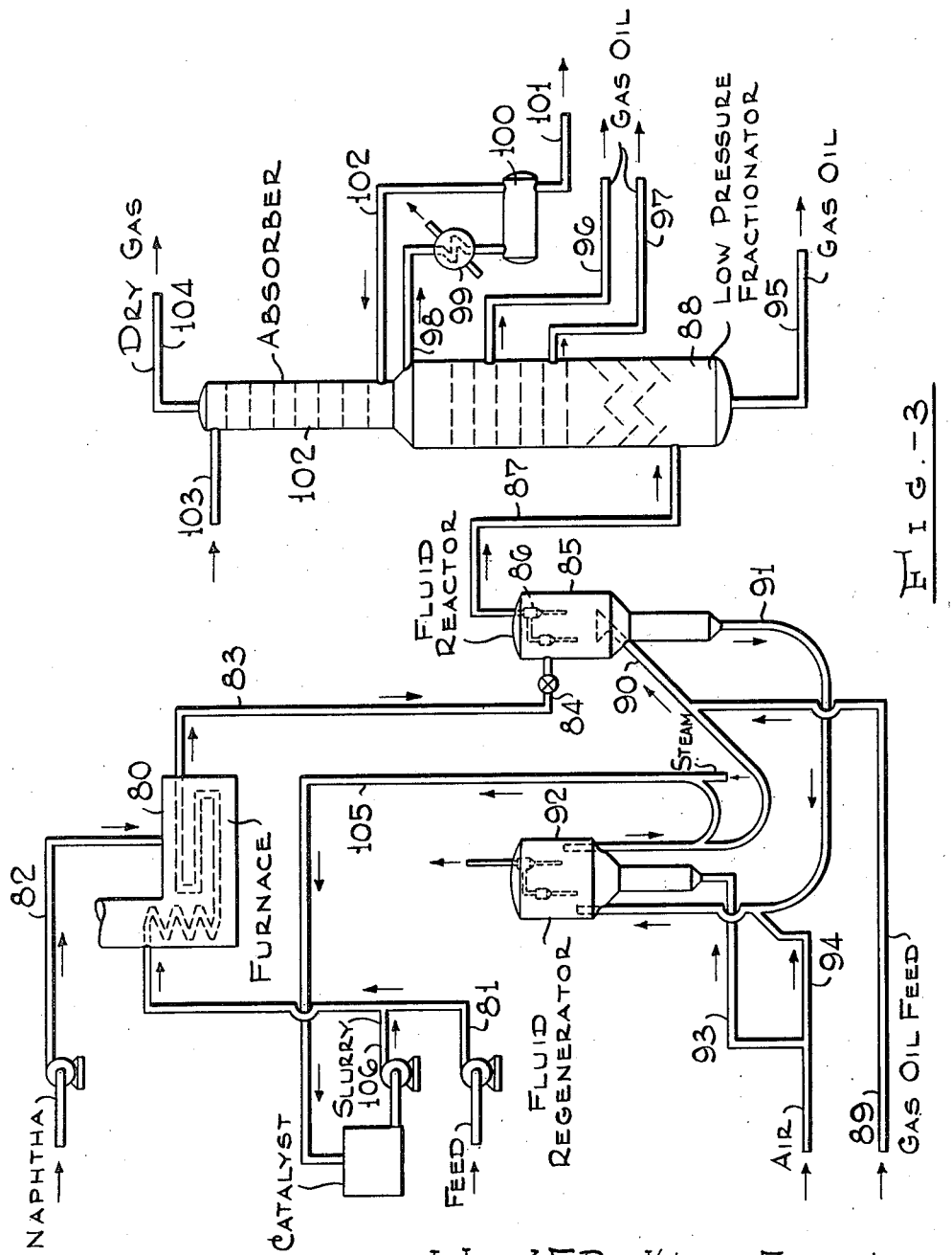

The present invention may be more fully appreciated by reference to the drawings illustrating embodiments of the same. Figure 1 illustrates an operation wherein the suspensoid coil outlet is provided with its own cyclone and high pressure product fractionator. Figure 2 illustrates an operation in which a common fractionator is used for the suspensoid and fluidized solids product. Figure 3 illustrates an operation in which the cracked product from the suspensoid furnace is charged directly into the top of the fluidized solids catalyst reactor.

Referring specifically to Figure 1, a petroleum heavy or cyclic gas oil or reduced crude fraction is introduced into suspensoid cracking furnace 1 by means of a feed line 2. If it is also desired to process a naphtha, it is preferable to introduce the naphtha fraction into the furnace 1 by means of line 3. Temperature and pressure conditions within the suspensoid furnace 1 are adapted to secure the desired cracking or conversion of the oil. The cracked products are withdrawn from suspensoid furnace 1 by means of line 4 and introduced into cyclones or equivalent means 5 wherein the catalyst particles are separated from the cracked products. The cracked products are removed from the cyclones 5 by means of line 6 and introduced into a high pressure fractionating zone 7, with or without quench. A light gas oil fraction is removed by means of line 8, while a heavy gas oil fraction is removed by means of line 9. A high boiling tar fraction is removed by means of line 10 while the lower boiling constituents are removed overhead by means of line 11. This gaseous overhead fraction is passed through a condensing zone 12 and introduced into a separator 13 wherein the condensate is separated from the gases, which are removed overhead by means of line 14. The condensate comprising constituents boiling in the motor fuel boiling range is removed from the bottom of zone 13 by means of line 15 and further handled and processed as desired. A recycle stream is preferably returned to zone 7 by means of line 16.

A hydrocarbon fraction boiling in the gas oil boiling range is introduced into a fluidized solids catalytic reactor 20 by means of line 21. This stream is mixed with fluidized solids catalyst which is introduced into zone 20 by means of line 22 through a distributing head. Temperature and pressure conditions as well as gas velocities and catalyst holdup are adjusted in zone 20 to secure the desired conversion of the relatively high boiling hydrocarbon constituents to lower boiling constituents. Spent catalyst is removed from zone 20 by means of line 23 and passed into a fluidized solids regeneration zone 24. Air or other oxygen containing gas is introduced into zone 24 by means of lines 25 and 26. Temperature and pressure conditions in regeneration zone 24 and catalyst holdup are adjusted to secure the desired burning of the catalyst and to regenerate the same. Regenerated catalyst is removed from zone 24 by means of line 22 and recycled to reaction zone 20. In accordance with the present invention the catalyst segregated in cyclones 5 from the suspensoid operation is preferably introduced by means of line 27 into reaction zone 20. However, it is within the concept of the present invention to introduce this catalyst into regeneration zone 24 by means of line 23. Combustion gases are passed through suitable cyclones 28 positioned in the top of regeneration zone 24 and are removed overhead by means of line 29.

Cracked products are removed overhead from reaction zone 20 through cyclones 30 and line 31, and are introduced into a low pressure fractionation zone 32. A high boiling gas oil stream is removed from the bottom of zone 32 by means of line 33. Intermediate gas oil boiling streams are removed from zone 32 by means of lines 34 and 35 respectively. A fraction comprising hydrocarbon constituents boiling in the motor fuel boiling range is removed overhead from zone 32 by means of line 36, passed through condensing zone 37 and introduced into a separation zone 38. Uncondensed gases are removed overhead from separation zone 38 by means of line 39 while a hydrocarbon liquid stream comprising constituents boiling in the motor fuel boiling range is removed from zone 38 by means of line 40. It is preferred to recycle a portion of this liquid product to zone 32 by means of line 41.

In accordance with the present invention a portion of the catalyst regenerated in zone 24 is segregated by means of line 110 mixed with oil to form a slurry and introduced into the feed stream to the suspensoid operation by means of line 111.

Referring specifically to Figure 2, a cyclic gas, a heavy virgin gas oil, or a reduced crude is introduced in the presence of a catalyst into suspensoid cracking furnace 50 by means of line 51. If it is also desired to process a naphtha, this fraction is introduced into zone 50 by means of line 52 as shown. Temperature and pressure conditions in zone 50 are adapted to secure the desired conversion of the relatively high boiling feed fractions to lower boiling constituents. The cracked products are withdrawn from zone 50 by means of line 53 and introduced into cyclone separators or equivalent means 54 wherein solid catalyst particles are separated from the cracked products. The cracked products are removed from cyclone separators 54 by means of line 55 and introduced into distillation zone 56, with or without quench.

A hydrocarbon fraction boiling in the gas oil boiling range is introduced into fluidized solids catalytic cracking reactor 57 by means of line 58. This feed stream is introduced into line 59 carrying fluidized solids catalyst from the regenerator 61 to the reactor 57. Temperature and pressure conditions and catalyst holdup in the reactor are adjusted to secure the desired conversion of the oil. Catalyst is withdrawn from the bottom of zone 57 by means of line 60 and passed into regeneration zone 61. Temperature and pressure, and catalyst holdup zone 61 are adjusted to secure the desired removal of the carbon from the catalyst and to regenerate the same. Air is introduced into the bottom of zone 61 by means of lines 62 and 63. Regenerated catalyst is withdrawn from zone 61 by means of line 59 and recycled to the reactor 67. Combustion gases are removed overhead from zone 61 by means of line 64. The cracked products are removed overhead from reactor 57 through cyclones 65 and introduced into zone 56 by means of line 66.

A heavy tar product is removed from the bottom of zone 66 by means of line 67 while a gas oil fraction is removed by means of line 68. A lower boiling gas oil fraction is removed from zone 56 by means of line 70 and a portion of the same preferably recycled to the top of zone 56 into an absorber section 57. The gas oil fraction is introduced into the top of absorber 57 by means of line 58. This stream is preferably cooled to the desired extent by means of heat exchanger 59. Relatively low boiling hydrocarbon constituents boiling below the motor fuel boiling range are removed from the absorber section 57 by means of line 60 and handled as desired. A hydrocarbon fraction comprising constituents boiling in the motor fuel boiling range is removed from zone 56 by means of line 70, condensed in condenser 71 and introduced into a separator drum 62. Uncondensed fractions are removed overhead from separation zone 72 and introduced into the bottom of the absorption section 57, by means of line 73.

In accordance with the present invention a portion of the catalyst from regeneration zone 61 is segregated by means of line 120. This catalyst is mixed with oil to form a slurry in zone 121 and then introduced into the feed to the suspensoid operation by means of line 122.

Referring specifically to Figure 3, a cyclic gas oil, heavy gas oil, or reduced crude fraction is introduced into a suspenoid cracking zone 80 by means of line 81. If a gas oil or reduced crude fraction is introduced into suspenoid cracking zone 80, under certain conditions, it may also be desirable to introduce a hydrocarbon fraction boiling in the motor fuel boiling range into zone 80. If this type of operation be conducted the naphtha is introduced by means of line 82 as shown. Temperature and pressure conditions are adjusted in zone 80 to secure the desired conversion of the oil. The cracked product is withdrawn from zone 80 by means of line 83 and passed with or without quench through reducing valve 84 and then introduced into the upper part of fluidized solids reactor 85 above the dense bed. Temperature and pressure conditions are adjusted in zone 85 to secure the desired conversion of the relatively high boiling constituents to lower boiling constituents. The cracked products are removed through cyclone separators 86 positioned in the top of zone 85 and withdrawn from zone 85 by means of line 87 and introduced into distillation zone 88. A gas oil fraction is introduced into zone 85 by means of line 89. This gas oil feed stream is introduced into line 90 through which fluidized catalyst is introduced into zone 85. Catalyst is removed from zone 85 by means of line 91 and passed to a fluidized catalyst regeneration zone 92. Temperature and pressure conditions in zone 92 are adjusted to secure the desired removal of carbon from the catalyst and to regenerate the same. Air is introduced into zone 92 by means of lines 93 and 94. Regenerated catalyst is withdrawn from zone 92 and recycled to reactor 85 by means of line 90.

A relatively high boiling gas oil, or tar fraction is removed from the bottom of zone 89 by means of line 95 while a light gas oil fraction is withdrawn by means of line 96 and an intermediate gas oil fraction by means of line 97. A fraction comprising constituents boiling in the motor fuel boiling range is removed from zone 89 by means of line 98, condensed in condenser zone 99 and passed to a separation zone 100. Constituents boiling in the motor fuel boiling range are removed from separation zone 100 by means of line 101 and handled as desired. Uncondensed gases are removed from the top of separation zone 100 by means of line 102 and preferably introduced into an absorption zone 102 positioned above zone 89. An absorption oil, preferably segregated from the heavy gas oil fraction, is introduced into the top of absorption zone 102 by means of line 103. Hydrocarbon constituents substantially free of normally liquid constituents are removed from the top of zone 102 by means of line 104.

In accordance with the present invention a portion of the catalyst removed from zone 92 is segregated by means of line 105 and mixed with a portion of the feed to the suspensoid operation. The slurry or catalyst is introduced into the feed stream by means of line 106.

The present invention is broadly concerned with an integrated distillation operation; a suspensoid operation and a fluidized solids catalytic cracking operation. The invention is more particularly concerned with an operation wherein a hydrocarbon fraction, as for example, one boiling in the heavy gas oil range (1000–1200° F.) or in the reduced crude range (1000–1400° F.) is processed in a suspensoid operation while a gas oil cut (380–1000° F.) is processed in a fluidized solids catalytic operation. A naphtha fraction (220°–450° F.) may also be processed with the foregoing feed stocks. The cracked products are then handled in cyclones and suitable fractionating equipment.

In an operation such as shown in Fig. 1, the suspensoid coil outlet is provided with its own cyclone and high pressure product fractionator. The catalyst from the cyclone is transferred to the fluidized catalyst cracking system by introducing it to the fluidized catalyst reactor or as an alternate to the fluidized catalyst regenerator. Regenerated catalyst is withdrawn from the fluidized catalyst regenerator and utilized to produce the slurry required in the suspensoid cracking operation.

In an operation illustrated by Fig. 2, a common fractionator is used for the suspensoid and fluidized catalytic products. As shown, this fractionator includes an integral absorber. It also may contain a topped crude stripping section in the base of the fractionator.

In an operation disclosed in Fig. 3, the product from the suspensoid furnace is charged directly into the top of the fluidized catalytic reactor utilizing the cyclones in this vessel to separate the catalyst from the suspensoid product. At the point of pressure release on the suspensoid circuit, quenching may be used if desirable.

In accordance with the present invention the process of discharging the whole suspensoid reactor coil outlet stream in the vapor phase directly into the reactor zone of the fluidized catalyst unit has a number of advantages. For example it eliminates the necessity of duplicating cyclone separators. Also the tar which would condense out on reduction of the temperature from say 1080°–1110° F. in the suspensoid reactor to 950 in the fluid reactor, may be cracked up in the fluidized catalytic reaction zone. In addition, if no quench is applied the hot products from the suspensoid coil when combined with cracked vapor from the fluid bed will be subjected to further cracking. Thus, in effect, an additional processing step is obtained.

The conditions of the suspensoid operation may be varied appreciably depending upon the character of the feed stock being processed and depending upon the extent of conversion desired. As pointed out, a suspensoid operation is particularly desirable for the cracking of hydrocarbon fractions boiling in the motor fuel boiling range, (80–420° F.) especially in the heavy naphtha boiling range (220°–450° F.). It is also desirable for processing residual stocks, as for example, those hydrocarbons boiling in the reduced crude boiling range, (1000 to 1400° F.) as well as heavy gas oils (1000°–1200° F.). The amount of solid catalyst employed per barrel of oil may vary appreciably, as for example from about 2 lbs. to 10 lbs. of catalyst per barrel of oil. However, it is preferred to use from about 5 to 10 lbs. of catalyst per barrel of oil. The temperatures of the suspensoid operation are in the range from about 800 to 1200° F. If a reduced crude is being processed, the process is usually in the range from 910°–920° F., whereas if a naphtha is being processed, the temperatures are of the magnitude of 950°–980° F. and higher. Pressures may vary from 200 to 400 lbs. per square inch to as much as 1000 lbs. per square inch.

The fluidized solids technique for processing feed fractions, as for example, petroleum hydrocarbons and for carrying out other chemical reactions, is a conventional one. The system of a fluidized solids technique comprises a reaction zone and a regeneration zone, employed in conjunction with a fractionation zone. The reactor and the catalyst regenerator are arranged at approximately an even level. The operation of the reaction zone and the regeneration zone is conventional, which preferably is as follows:

An overflow pan is provided in the regeneration zone at the desired catalyst level. The catalyst overflows into a withdrawal line which preferably has the form of a U-shaped seal leg connecting the regeneration zone with the reaction zone. The feed stream introduced is usually preheated to a temperature in the range from about 500° to 650° F. in exchangers in heat exchange with regenerator flue gases which are removed overhead from the regeneration zone, or with cracked products. The heated feed stream is withdrawn from the exchangers and introduced into the reactor. The seal leg is usually sufficiently below the point of feed oil injection to prevent oil vapors from backing into the regenerator in case of normal surges. Since there is no restriction in the overflow line from the regenerator, satisfactory catalyst flow will occur as long as the catalyst level in the reactor is slightly below the catalyst level in the regenerator when vessels are carried at about the same pressure. Spent catalyst from the reactor flows through a second U-shaped seal leg from the bottom of the reactor into the bottom of the regenerator. The rate of catalyst flow is controlled by injecting some of the air into catalyst transfer line to the regenerator.

The pressure in the regenerator may be controlled at the desired level by a throttle valve in the overhead line from the regenerator. Thus, the pressure in the regenerator may be controlled at any desired level by a throttle valve which may be operated, if desired, by a differential pressure controller. If the pressure differential between the two vessels is maintained at a minimum, the seal legs will prevent gases from passing from one vessel into the other in the event that the catalyst flow in the legs should cease.

The reactor and the regenerator may be designed for high velocity operation involving linear superficial gas velocities of from about 2.5 to 4 feet per second. However, the superficial velocity of the upflowing gases may vary from about 1-5 and higher. Catalyst losses are minimized and substantially prevented in the reactor by the use of multiple stages of cyclone separators. The regeneration zone is provided with cyclone separators. These cyclone separators are usually from 2 to 3 and more stages.

Distributing grids may be employed in the reaction and regeneration zones. Operating temperatures and pressures may vary appreciably depending upon the feed stocks being processed and upon the products desired. Operating temperatures are, for example, in the range from about 800° to 1000° F., preferably about 850°-950° F., in the reaction zone. Elevated pressures may be employed, but in general pressures below 100 lbs. per sq. in. gauge are utilized. Pressures generally in the range from 1 to 30 lbs. per sq. in. gauge are preferred. A catalyst hold-up corresponding to a space velocity of 1 to 20 weights per hour of feed per weight of catalyst is utilized. A preferred ratio is 2 to 4. Catalyst to oil ratios of about 3 to 10, preferably about 6 to 8 by weight are used.

The catalytic material used both in the suspensoid operation and in the fluidized catalyst cracking operation, in accordance with the present invention, are conventional cracking catalysts. These catalysts are oxides of metals of Groups II, III, IV and V of the Periodic Table. A preferred catalyst comprises silica-alumina wherein the weight per cent of the alumina is in the range from about 5 to 20%. Another preferred catalyst comprises silica-magnesium where the weight per cent of the magnesia is about 5% to 20%. These catalysts may also contain a third constituent, as for example, $ThO_2$, $WO_3$, $MoO$, $BeO$, $Bi_2O_3$, $CdO$, $UO_3$, $B_2O_3$, $SnO_2$, $Fe_2O_3$, $V_2O_5$, $MnO$, $Cr_2O_3$, $CaO$, $Tl_2O_3$, $MgO$ and $Ce_2O_3$ present in the concentration from 0.05% to 0.5%.

The size of the catalyst particles is usually below about 200 microns. Usually at least 50% of the catalyst has a micron size in the range from about 20-80. Under these conditions with the superficial velocities as given, a fluidized bed is maintained wherein the lower section of the reactor, a dense catalyst phase exists while in the upper area of the reactor a dispersed phase exists.

Having described the invention, it is claimed:

1. Improved process for the conversion of relatively high boiling hydrocarbon constituents into relatively low boiling constituents which comprises, contacting a hydrocarbon feed stream in a reaction zone in the presence of fluidized catalytic particles under temperature and pressure conditions adapted to crack said high boiling hydrocarbon constituents, withdrawing catalytic particles from said reaction zone and regenerating the same in a fluidized catalytic regeneration zone, withdrawing regenerated particles from said regeneration zone and recycling a portion of the same to said reaction zone, combining a portion of said withdrawn catalytic particles from said regeneration zone with a second hydrocarbon feed stream, passing said second hydrocarbon stream to a suspensoid cracking zone maintained under temperature and pressure conditions adapted to secure the desired conversion of the oil, withdrawing a cracked product overhead from said reaction zone, withdrawing a cracked product from said suspensoid zone and introducing the same through pressure reducing means to the dilute phase zone above said reaction zone whereby said cracked products from said suspensoid cracking zone pass through separation means in the top of said reaction zone and wherein the catalytic particles are separated from said cracked products.

2. Process as defined by claim 1 wherein said catalytic particles comprise silica alumina particles.

3. Process as defined by claim 1 wherein the pressure in said reaction zone is in the range from about 0-30 lbs. gauge and wherein the temperature in said reaction zone is in the range from about 800 to 1000° F., and wherein the pressure in said suspensoid zone is in the range from about 300 to 1000 lbs. and wherein the temperature in said suspensoid zone is in the range from about 800 to 1100° F.

4. Process as defined by claim 1 wherein the feed stream introduced into said reaction zone boils in the gas oil boiling range and wherein said second stream introduced into said suspensoid zone boils in the naphtha boiling range.

References Cited in the file of this patent

UNITED STATES PATENTS

| Number | Name | Date |
| --- | --- | --- |
| 2,343,649 | Egloff | Mar. 7, 1944 |
| 2,353,731 | Kanhofer | July 18, 1944 |
| 2,382,755 | Tyson | Aug. 14, 1945 |
| 2,488,032 | Johnson | Nov. 15, 1949 |
| 2,521,757 | Smith | Sept. 12, 1950 |
| 2,541,237 | Goodson | Feb. 13, 1951 |